United States Patent [19]

Lawwill

[11] Patent Number: 4,789,174

[45] Date of Patent: Dec. 6, 1988

[54] SUSPENSION BICYCLE

[76] Inventor: Mert Lawwill, 148 Rock Hill Dr., Tiburon, Calif. 94920

[21] Appl. No.: 42,792

[22] Filed: Apr. 27, 1987

[51] Int. Cl.⁴ .................. B62K 25/04; B60G 15/00
[52] U.S. Cl. ..................................................... 280/284
[58] Field of Search ............... 280/283, 284, 285, 288; 180/227

[56] References Cited

U.S. PATENT DOCUMENTS

| | | | |
|---|---|---|---|
| 1,369,356 | 2/1921 | Rigby | 280/284 |
| 4,076,271 | 2/1978 | Doncque | 180/227 X |
| 4,574,909 | 3/1986 | Ribi | 280/284 X |
| 4,596,302 | 6/1986 | Suzuki et al. | 280/284 X |
| 4,673,053 | 6/1987 | Tanaka et al. | 280/284 X |

FOREIGN PATENT DOCUMENTS

| | | | |
|---|---|---|---|
| 841661 | 5/1939 | France | 280/284 |
| 986467 | 8/1951 | France | 280/284 |
| 18770 | of 1915 | United Kingdom | 280/284 |

Primary Examiner—John J. Love
Assistant Examiner—Charles R. Watts
Attorney, Agent, or Firm—James E. Eakin

[57] ABSTRACT

A suspension bicycle is disclosed in which a rear suspension includes swing arms, control arms, and hub plates connected to the seat riser tube of the frame in a trapezoidal arrangement. The swing arms, control arms, and hub plates are configured to balance the forces applied to the rear wheel by the chain during pedaling so as to prevent energy absorbing movement of the rear suspension as the result of such pedaling. A shock absorber is also connected to the swing arms to absorb shocks during riding. The suspension of the present invention also is configured to provide improved traction during pedaling uphill or over uneven surfaces.

9 Claims, 2 Drawing Sheets

SUSPENSION BICYCLE

FIELD OF THE INVENTION

The present invention relates to bicycles, and more particularly relates to bicycles employing suspension means.

BACKGROUND OF THE INVENTION

Bicycles have long been used as a means of transportation and recreation. However, virtually all bicycles known in the prior art have involved a relatively rigid frame, which transmits directly to the rider shocks resulting from potholes, rocks, or other unevenness in the riding surface. This has resulted in discomfort to the rider which is at the least undesirable, if not unacceptable.

The solution to this problem found in the prior art has been to include a shock absorbing suspension on the bicycle similar to those found in motorcycles or on cars. Thus, for example, British Patent No. 104,022 discloses a suspension arrangement for motorcycles, cycles and the like in which a shock absorber is mounted on an extra seat riser tube and is connected via a linkage to the rear wheel and its associated control arms.

Likewise, French Patent No. 933,079 discloses a somewhat similar arrangement which involves two shock absorbers but only a single seat riser tube. Yet another example is found in U.S. Pat. No. 944,795, which again is intended for use in "motorcycles, bicycles and the like" and involves a single shock absorber mounted behind the seat riser tube and connected there to the control arms for the rear wheel. Yet another example is found in U.S. Pat. No. 978,881, intended for use in motorcycles and the like, in which a shock absorbing means is positioned along the upper backstays, or swing arms, with the amount of travel limited by backstays connected near the tip of the rear fork.

Yet another example is shown in U.S. Pat. No. 1,039,684, described as a shock absorber for motor cycles, in which a shock absorber is located immediately behind the seat riser and connected to the rear wheel via a linkage affixed to the seat riser. In U.S. Pat. No. 1,047,431, a leaf spring arrangement connected at the bottom of the seat riser tube is intended to absorb shocks received at the rear wheel. In U.S. Pat. No. 1,056,492, a motorcycle frame is disclosed in which a shock absorber is included in the tubular arms 4. Still another approach is found in U.S. Pat. No. 1,148,170, in which a shock absorbing spring is located around the seat riser, and connected to a pivotable linkage at the top of the seat riser.

A more recent approach can be found in U.S. Pat. No. 3,865,402, in which a shock absorber is mounted on either side of the rear wheel similar to a conventional motorcycle suspension. In U.S. Pat. No. 3,931,990, a single shock absorber is positioned substantially horizontally between the seat riser and the downtube of the frame. The shock absorber is pivotably linked to the rear wheels at the seat riser. Yet another approach is shown in U.S. Pat. No. 3,982,770, in which a single shock absorber is located on a tube extending between the top of the down tube and the middle of the seat riser, and is thence connected to the rear wheel.

Finally, still another approach is shown in an advertisement for the "Descender" mountain bicycle, in which a single shock absorber is positioned in front of and pivotably connected to the seat riser tube, with the other end of the pivot arm connected to a rear wheel swing arm.

The difficulty with each of these prior art designs is that each of them absorbs a significant amount of force which would otherwise provide forward movement. While this loss is not significant for motorcycles, it is unacceptable where the only available motive force is the pedaling of a human being.

The energy loss in cycles found in the prior art results from the fact that when the rear sprocket on the cycle turns, the rotational force on the rear wheel causes the rear wheel to rise upward against the suspension. This will typically be perceived as the cycle settling slightly.

There has therefore been a need for a suspension bicycle which transforms substantially all of the pedaling force into forward motive force without substantial loss to the suspension.

SUMMARY OF THE INVENTION

The present invention provides a bicycle suspension which transforms substantially all of the pedal force into forward motive force by providing a novel and unobvious linkage arrangement which neutralizes the tendency of the suspension to absorb the pedal forces.

More specifically, the motion of pedaling can be broken into two components. The first component represents the force converted into forward movement, while the second represents force absorbed by the suspension. By creating a linkage which creates a vectored force substantially equal and opposite to that absorbed by the suspension, nearly all of the pedal force is available for forward movement. In addition, while the present invention is particularly desirable for bicycles or other pedal-powered vehicles, the energy saving features of the present invention may be implemented in motorcycles or other motor driven vehicles.

In one embodiment, the desired balance is substantially achieved in the present invention by providing a shock absorber located aft of the seat riser tube. The top of the shock absorber is affixed to the seat riser tube, and the bottom of the shock absorber is pivotably connected to a linkage extending between nearly the bottom of the seat riser and a pair of rear wheel control arms. The control arms are pivotably affixed to the frame of the bicycle at the rear of the bottom bracket housing. The other end of each of the control arms is pivotably connected to a hub plate which supports the rear wheel.

A pair of control arms also extend between the seat riser tube and the hub plate, with the control arms being pivotably connected at both ends.

By appropriately positioning the pivot points of the control arms, swing arms, and the hub plates, the force vector representing loss to the suspension is substantially neutralized, and the pedaling forces are substantially entirely available for forward movement.

It is therefore one object of the present invention to provide a suspension bicycle in which the pedaling forces are substantially available for forward movement rather than lost to the suspension.

It is another object of the present invention to simple but efficient suspension bicycle.

These and other objects of the present invention will be better appreciated from the following Detailed Description of the Invention, in which FIG. 1 illustrates a suspension bicycle according to the present invention, FIG. 2 illustrates the linkage connecting the bottom of the shock absorber to the frame and control arms of the bicycle of FIG. 1, and FIG. 3 illustrates the pivotable hub plate of the bicycle of FIG. 1.

DETAILED DESCRIPTION OF THE INVENTION

Figure 1:
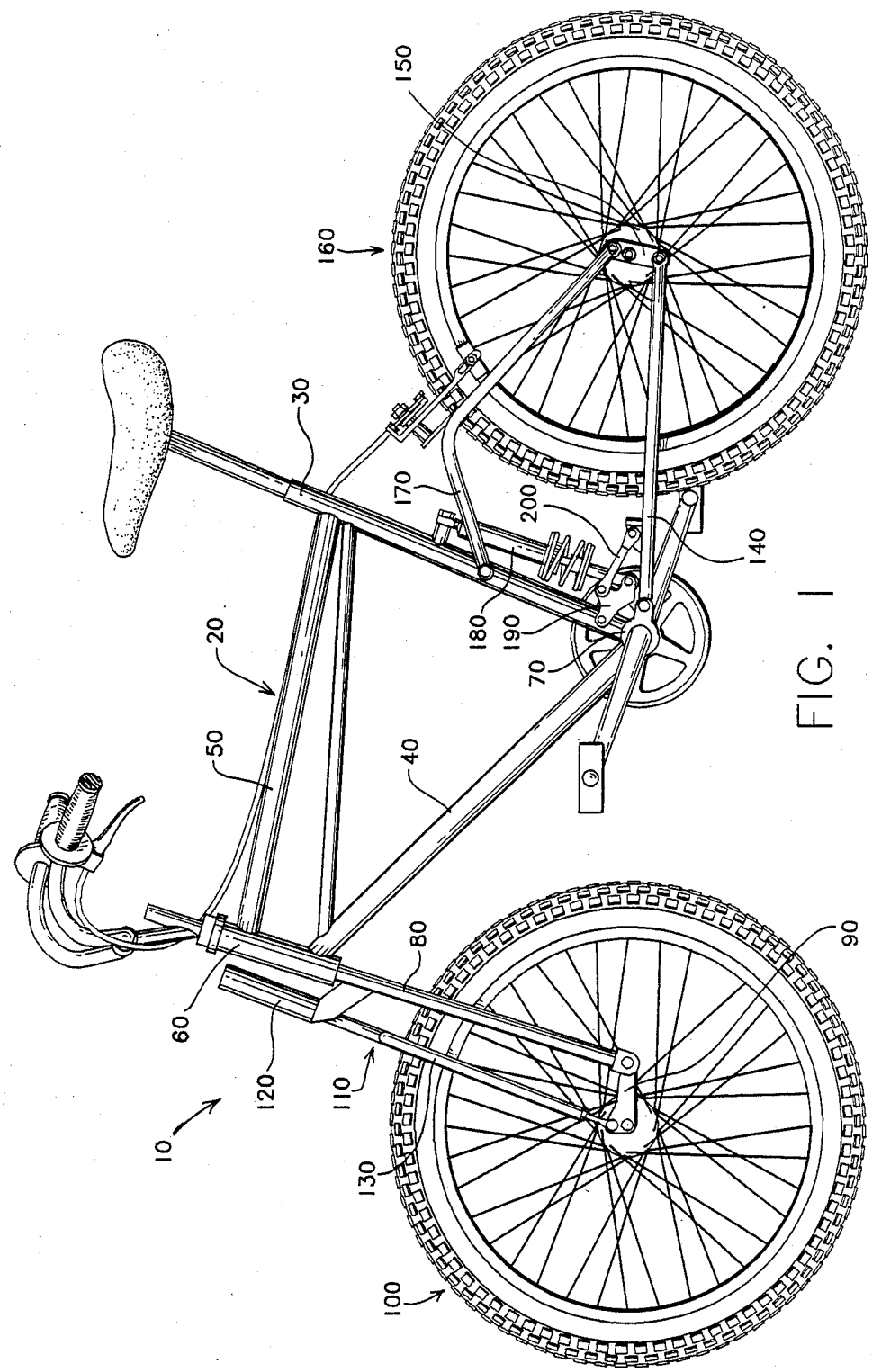
Figure 3:
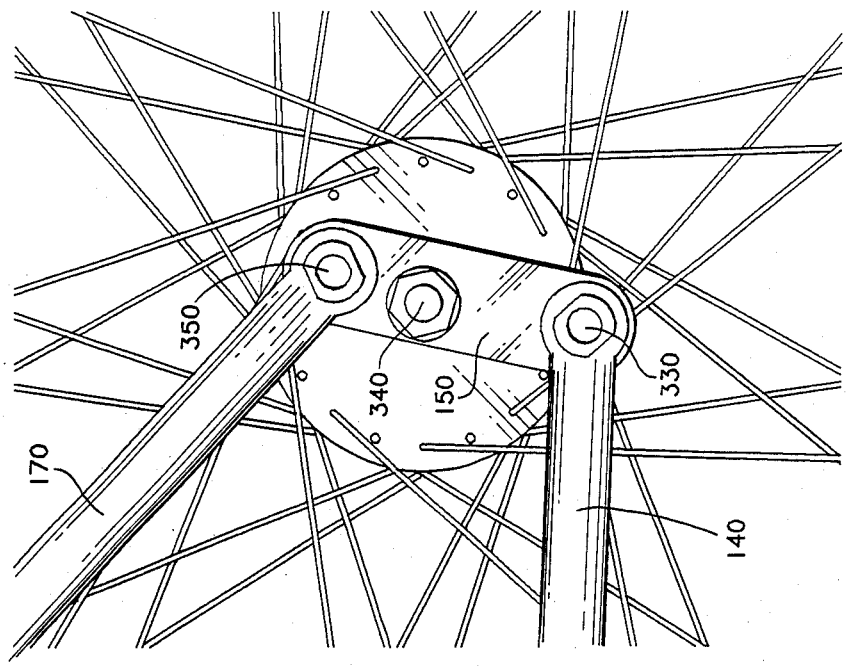

Referring first to FIG. 1, one embodiment of the present invention may be seen in side elevational view. The bicycle 10 includes a frame 20 which includes a seat riser tube 30, a down tube 40, a brace tube 50, and a front fork tube 60.

The seat riser 30 is rigidly affixed at its top to the brace 50, and is rigidly connected to the bottom end of the down tube 40 at a bottom bracket housing 70. The remaining ends of both the down tube 40 and brace 50 both rigidly connect to the front fork tube 60 at bottom and top respectively.

The front fork tube 60 pivotably supports the front forks 80, and is pivotably mounted to a front hub plate 90. The front hub plate connects at its center to the hub of a front wheel 100, and at its other end is pivotably affixed to a front suspension 110, which may comprise a shock absorber 120 and a support tube 130. The top of the front suspension 110 is fixedly attached to the top of the front fork tube 60.

The rear suspension of the bicycle 10 comprises a pair of swing arms 140 (only one of which can be seen in FIG. 1) which are pivotably attached to the frame 20 at the rear of the bottom bracket housing 70. The rear end of the swing arms 140 are pivotably attached to their respective rear hub plates 150. The hub plates support the rear wheels 160, and at their upper end pivotably connect to a pair of control arms 170, only the left side of which are visible in FIG. 1. The control arms 170 pivotably connect at the remaining end to the seat riser 30 For purposes of convenience of description, the swing arms 140 and control arms 170 each may be regarded in at least some circumstances as a single arm, and are occasionally referred to herein in this manner.

Connected to the back of the seat riser 30 is the top of a shock absorber 180, the other end of which is pivotably connected to a linkage 190. The linkage 190 is pivotably connected to the bottom end of the seat riser tube 30, and pivotably linked to the swing arms 140 through control links 200. The purpose of the linkage 190 and control links 200 is to implement approximately a three to one ratio between wheel travel and shock travel. It will also be appreciated that other ratios or embodiments could readily be implemented, including placing the shock 180 in front of the seat riser tube 30 or connecting the shock absorber 180 directly to the swing arm 140.

Figure 2:
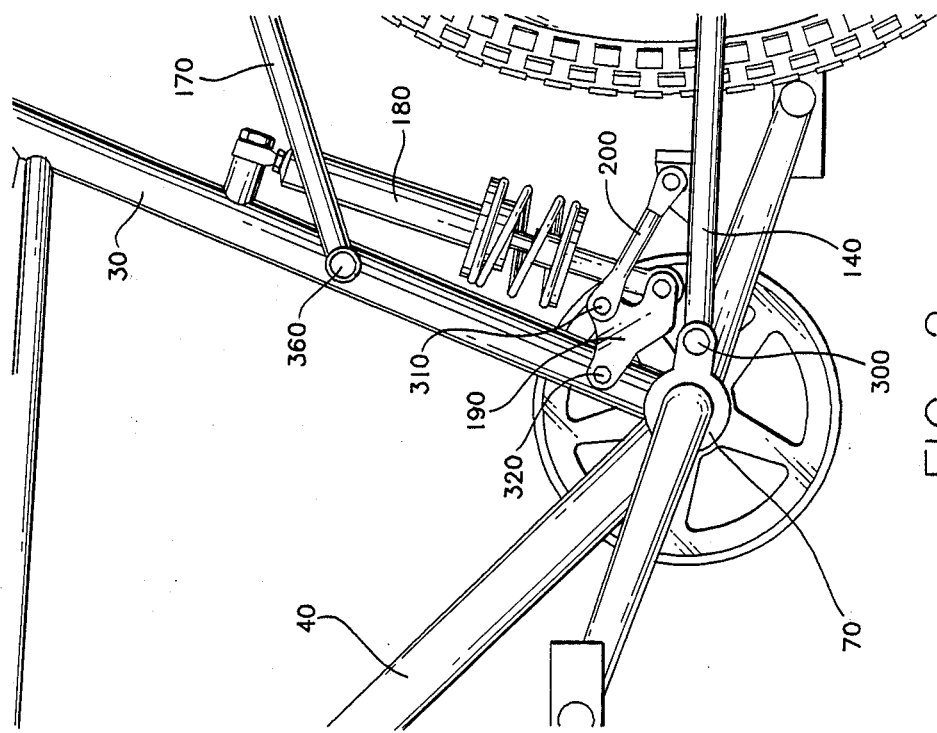

Referring next to FIG. 2, the linkage connecting the bottom of the shock absorber 180 to the seat riser 30 and swing arms 140 can be better appreciated. Upon application of downward force, the swing arms 140 will move upward by pivoting about pivot point 300. The upward force will drive the control links 200 upward through the connection to the linkage 190 at the pivot point 310. The linkage 190 will then rotate about the pivot point 320, in turn causing the shock absorber 180 to be compressed.

As the swing arms 140 move upward, their connection to the forces the rear hub plate 150 to pivot in a clockwise direction about the pivot point 330. The corresponding clockwise rotation of the point 350 necessarily causes the control arms 170 to move slightly downward in relation to the point 340. Because the point 340 is offset toward the pivot point 350 and away from the pivot point 330, and also because of the location of the pivot points 300 and 360, the control arms 170, swing arms 140 and rear hub plate 150 impose a physical limit on the travel through which the rear wheel 160 can move due to pedaling forces.

A key feature of the present invention is that the suspension includes features which balance, or neutralize, the tendency of a suspension to absorb motive energy. Because the present invention neutralizes such energy absorbing tendencies, motive energy applied to the bicycle, either by pedaling or through motors or other motive means, is efficiently translated into forward movement.

The energy absorbing tendencies are neutralized by virtue of the trapezoid formed by the location of the pivot points 300, 330, 350 and 360, together with the point 340 at which the rear wheel is affixed. It will be appreciated from FIG. 2 that the pivot point 360 is located substantially above the point 340, whereas the pivot point 300 is located only slightly below. For purposes of this analysis the control arm 170 may be represented by a single straight line extending between the pivot points 350 and 360.

When a rotational force is applied to the wheel, as during pedaling, the point 340 attempts to rise. Because of the control arm 170, the point 340 may only move in an arc about pivot point 360. However, the amount of movement is limited by the length of the swing arms 140, which can only pivot about the point 300. As a result, the swing arms 140, control arms 170 and pivot plate 150 provide a force having a downward component. This downward force vector quickly that the rotational force applied to the rear wheel is translated efficiently into forward movement. It can therefore be appreciated that the control arms 170, hub plates 150, and swing arms 140 means are configured to balance the forces applied to the rear wheel by the chain during pedaling so as to prevent energy absorbing movement of the rear suspension as the result of such pedaling.

It can further be appreciated that the balancing of forces between the control arms and the swing arms does not impose a mechanical limit on the travel of the rear wheel in response to shocks, but rather provides a locking out, or leverage limit, of movement in response to a chain force. This balancing of forces therefore permits substantially all of the rider's pedaling energy to be translated into forward movement, rather than being absorbed by the suspension system as occurs in the prior art.

It will also be noted that, in the preferred embodiment, the relative lengths of the control arms 170 and swing arms 140 are arranged so the pivot point 350 is slightly rearward of the point 340 and the pivot point 330. However, such an arrangement is not necessarily required in all applications of the invention.

An additional and unexpected feature of the present 1 invention which has been discovered is that the bicycle design of the present invention provides increased traction during operation, and particularly while climbing hills. The increased traction results because rotation of the control arms 170 causes a transfer of weight to the swing arms 140. This, in turn, transfers the weight to a point higher over the axle center, resulting in increased traction.

Referring again to the control arms 170, it will be appreciated from FIG. 2 that the control arms shown are bent upward. Also mounted on the control arm is a rear brake, which may be of any conventional type such as cantilever. The bend is provided to permit the brake to contact the rim of the tire throughout the range of travel of the rear wheel 160. In the event the rear brake is located in an alternative location, such as through the use of a disc brake, for example, the swing arms may be simplified to straight tubing.

Having described a preferred embodiment, numerous alternatives and equivalents will be apparent to those of ordinary skill in the art, given the teachings herein. It is therefore to be understood that the present invention is not to be limited by the detailed description provided above, but rather is to be limited only by the appended claims.

What is claimed is:

1. In a bicycle having a frame including a rear wheel with a hub, a seat riser tube and a bottom bracket, the improvement comprising hub plate means having upper and lower ends for positioning the rear wheel, swing arms means for movably positioning the lower end of the hub plate means, the swing arms means having first and second ends and being pivotably connected at the first end thereof to the rear of the bottom bracket and at the second end thereof to the lower end of a hub plate means, shock absorber means connected between the swing arms means and the frame to absorb shocks, and control arm means for movably positioning the upper end of the hub plate means and being pivotably connected at one end to the upper end of the hub plate means and at the other end to the seat riser tube, the swing arm means, hub plate means and control arm means being capable of limiting a range of movement of the rear wheel so as to substantially prevent the shock absorber means from absorbing pedaling energy.

2. The invention of claim 1 further wherein the control arm means is a pair of interconnected control arms.

3. The invention of claim 2 wherein the swing arm means is a pair of interconnected swing arms.

4. The invention of claim 3 wherein the hub plate means is a pair of hub plates having a connection point for rotatably affixing the hub plates to the hub.

5. The invention of claim 4 further including a pedaling means including a chain connected to the rear wheel wherein the control arm means, hub plate means, and swing arm means are configured to balance forces applied to the rear wheel by the chain during pedaling so as to prevent energy absorbing movement of the rear suspension during such pedaling.

6. The invention of claim 1 wherein the control arm means, hub plate means and swing arm means are configured to cause the upper end of the hub plate to maintain an acute angle relative to a vertical reference throughout the range of travel of the rear wheel.

7. The invention of claim 6 wherein the control arm means is adapted to receive a braking mechanism, and includes a bend.

8. A suspension bicycle having a frame including a seat riser tube and a bottom bracket, a rear wheel having an axle, a pair of hub plates, one located on either side of the axle, having an upper pivot point and a lower pivot point, a first pivot point located at the rear of the bottom bracket, a pair of swing arms each connected at one end thereof to the first pivot point and at the other end of the lower pivot point of the pair of hub plates, a second pivot point located on the seat riser tube at a point above the height of the axle of the rear wheel, a pair of control arms each connected at one end thereof to the second pivot point and at the other end to the upper pivot point of the pair of hub plates, the distance from the first pivot point to the lower pivot point being less than the distance from the second pivot point to the axle, and the distance from the second pivot point to the axle being less than the distance from the second pivot point to the upper pivot point, and shock absorber means connected between at least one of the swing arms and the frame to absorb shocks.

9. A suspension bicycle having a frame including a seat riser tube and a bottom bracket, a rear wheel having a rim and a hub with an axle hub plate means for mounting the rear wheel and located on either side of the hub and having an upper pivot point and a lower pivot point, the hub plate means being connected to the hub at a connection point closer to the lower pivot point than the upper pivot point, a first pivot point located at the rear of the bottom bracket, swing arm means for supporting the hub plate means and connected at one end thereof to the first pivot point and at another end to the lower pivot point of the hub plate means, shock absorber means connected between at least one of the swing arms and the frame to absorb shocks, a second pivot point located on the seat riser tube at a point above the height of the hub of the rear wheel, control arm means having a range of movement for positioning the hub plate means and connected at one end thereof to the second pivot point and at the other end to the upper pivot point of the hub plate means, the distance from the second pivot point to the upper pivot point being greater than the distance from the second pivot point to the axle which in turn is greater than the distance from the first pivot point to the lower pivot point, said control arm means adapted to receive a braking mechanism and including a bend to permit the braking mechanism to maintain contact between the braking mechanism and the wheel during braking at least substantially throughout the range of movement of the control arm means, the swing arm means, control arms means and hub plate means being configured to prevent substantial absorption of motive energy by the shock absorber means.

* * * * *